United States Patent
Hol et al.

(10) Patent No.: US 12,008,155 B2
(45) Date of Patent: *Jun. 11, 2024

(54) REDUCING STARTUP TIME OF AUGMENTED REALITY EXPERIENCE

(71) Applicant: Snap Inc., Santa Monica, CA (US)

(72) Inventors: Jeroen Diederik Hol, Hengelo (NL); Matthias Kalkgruber, Vienna (AT); Erick Mendez Mendez, Vienna (AT); Niall Murphy, Dublin (IE); Gerald Nilles, Culver City, CA (US); Mathieu Emmanuel Vignau, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/201,419

(22) Filed: May 24, 2023

(65) Prior Publication Data
US 2023/0297164 A1 Sep. 21, 2023

Related U.S. Application Data

(63) Continuation of application No. 17/743,194, filed on May 12, 2022, now Pat. No. 11,681,361.
(Continued)

(51) Int. Cl.
*G06F 3/01* (2006.01)
*G01C 21/16* (2006.01)
(Continued)

(52) U.S. Cl.
CPC ......... *G06F 3/012* (2013.01); *G01C 21/1656* (2020.08); *G02B 27/0172* (2013.01);
(Continued)

(58) Field of Classification Search
CPC ....... G06F 3/012; G06F 3/14; G01C 21/1656; G02B 27/0172; G02B 27/0179;
(Continued)

(56) References Cited

U.S. PATENT DOCUMENTS 10,884,505 B1 1/2021 Huo et al.
11,681,361 B2 6/2023 Hol et al.
(Continued)

FOREIGN PATENT DOCUMENTS

| CN | 117321543 | 12/2023 |
|---|---|---|
| WO | WO-2017143716 A1 | 8/2017 |
| WO | WO-2022241123 A1 | 11/2022 |

OTHER PUBLICATIONS

"U.S. Appl. No. 17/743,194, Non Final Office Action dated Nov. 10, 2022", 11 pgs.
(Continued)

*Primary Examiner* — Dmitriy Bolotin
(74) *Attorney, Agent, or Firm* — Schwegman Lundberg & Woessner, P.A.

(57) ABSTRACT

A method for improving the startup time of a six-degrees of freedom tracking system is described. An augmented reality system receives a device initialization request and activates a first set of sensors in response to the device initialization request. The augmented reality system receives first tracking data from the first set of sensors. The augmented reality system receives an augmented reality experience request and in response to the augmented reality request, causes display of a set of augmented reality content items based on the first tracking data and simultaneously activates a second set of sensors. The augmented reality system receives second tracking data from the activated second set of sensors. The
(Continued)

augmented reality system updates the display of the set of augmented reality content items based on the second tracking data.

20 Claims, 10 Drawing Sheets

Related U.S. Application Data

(60) Provisional application No. 63/188,600, filed on May 14, 2021.

(51) Int. Cl.
  *G02B 27/01* (2006.01)
  *G06F 3/14* (2006.01)
  *G06T 7/20* (2017.01)

(52) U.S. Cl.
  CPC ........... *G02B 27/0179* (2013.01); *G06F 3/14* (2013.01); *G06T 7/20* (2013.01); *G02B 2027/0138* (2013.01); *G02B 2027/014* (2013.01); *G02B 2027/0178* (2013.01)

(58) Field of Classification Search
  CPC ...... G02B 2027/0138; G02B 2027/014; G02B 2027/0178; G06T 7/20
  See application file for complete search history.

(56) References Cited

U.S. PATENT DOCUMENTS

| | | |
|---|---|---|
| 2012/0147531 A1 | 6/2012 | Rabii |
| 2015/0193018 A1 | 7/2015 | Venable et al. |
| 2015/0317832 A1* | 11/2015 | Ebstyne .................. G06F 3/012 345/633 |
| 2017/0337839 A1 | 11/2017 | Yudofsky et al. |
| 2018/0108179 A1 | 4/2018 | Tomlin et al. |
| 2018/0261012 A1 | 9/2018 | Mullins et al. |
| 2019/0282324 A1 | 9/2019 | Freeman et al. |
| 2020/0074738 A1 | 3/2020 | Hare et al. |
| 2020/0159337 A1* | 5/2020 | Kin ....................... G06F 3/0304 |
| 2022/0331013 A1 | 10/2022 | Shelton, IV et al. |
| 2022/0365592 A1 | 11/2022 | Hol et al. |

OTHER PUBLICATIONS

"U.S. Appl. No. 17/743,194, Notice of Allowance dated Feb. 8, 2023", 6 pgs.
"U.S. Appl. No. 17/743,194, Response filed Jan. 19, 2023 to Non Final Office Action dated Nov. 10, 2022", 10 pgs.
"International Application Serial No. PCT/US2022/029005, International Search Report dated Aug. 24, 2022", 4 pgs.
"International Application Serial No. PCT/US2022/029005, Written Opinion dated Aug. 24, 2022", 7 pgs.
"International Application Serial No. PCT/US2022/029005, International Preliminary Report on Patentability dated Nov. 23, 2023", 9 pgs.

* cited by examiner

REDUCING STARTUP TIME OF AUGMENTED REALITY EXPERIENCE

CLAIM OF PRIORITY

This application is a continuation of U.S. patent application Ser. No. 17/743,194, filed May 12, 2022, which claims priority to U.S. Provisional Patent Application Ser. No. 63/188,600, filed May 14, 2021, which applications are incorporated herein by reference in their entireties.

TECHNICAL FIELD

The subject matter disclosed herein generally relates to a visual tracking system. Specifically, the present disclosure addresses systems and methods for reducing a startup time of the visual tracking system.

BACKGROUND

Augmented reality (AR) allows users observe a scene while simultaneously seeing relevant virtual content that may be aligned to items, images, objects, or environments in the field of view of an AR device. The AR device includes a 6DOF (six degrees of freedom) tracking system that may require substantial power consumption. To conserve power, the AR device may be set to a sleep mode and awoken in response to a user requesting a start of an AR experience. However, the time from the sleep mode to active mode can result in some time delay.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

Figure 1:
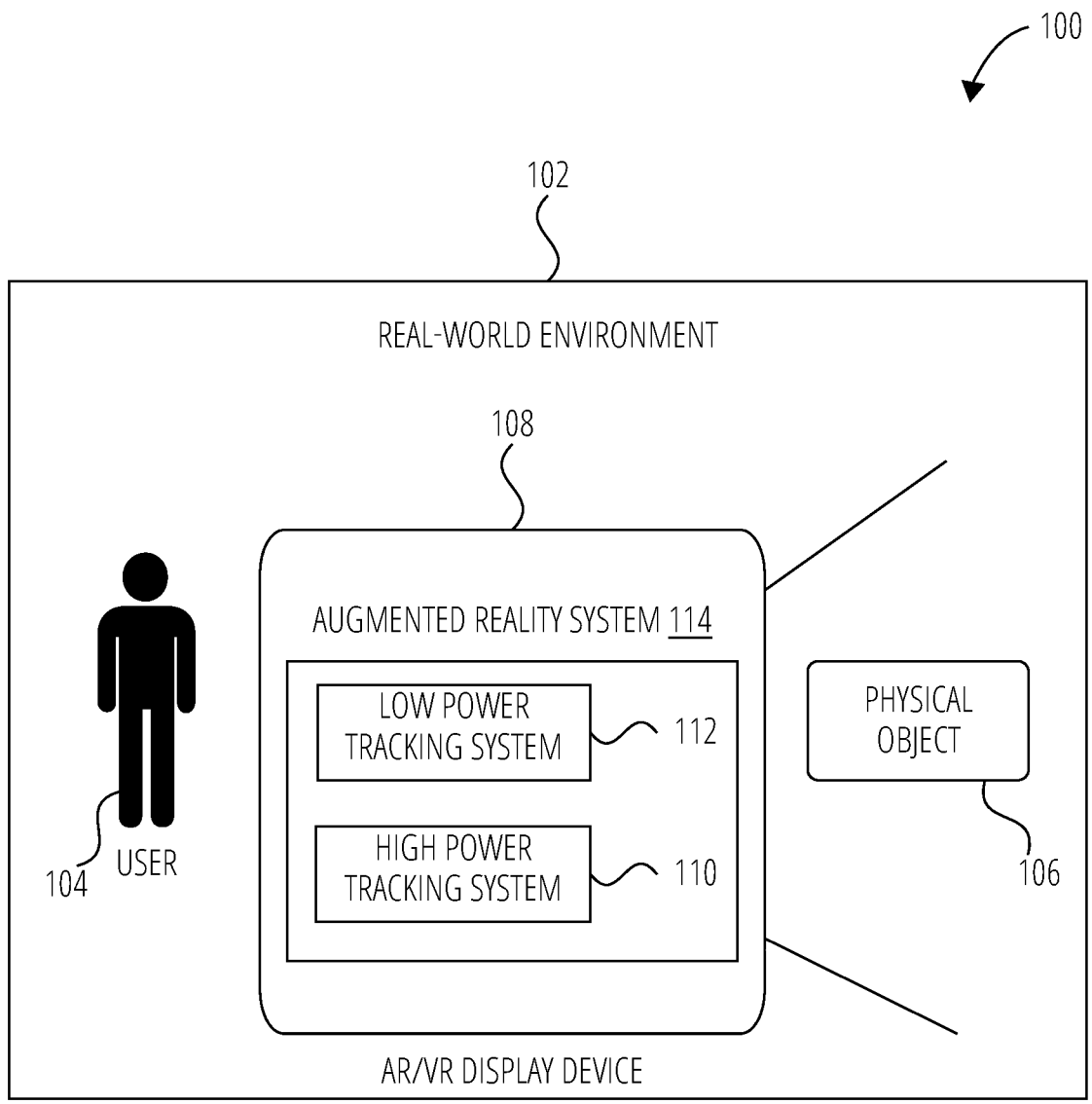
FIG. 1 is a block diagram illustrating an environment for operating an AR/VR display device in accordance with one example embodiment.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural Components, such as modules) are optional and may be combined or subdivided, and operations (e.g., in a procedure, algorithm, or other function) may vary in sequence or be combined or subdivided.

The term "augmented reality" (AR) is used herein to refer to an interactive experience of a real-world environment where physical objects that reside in the real-world are "augmented" or enhanced by computer-generated digital content (also referred to as virtual content or synthetic content). AR can also refer to a system that enables a combination of real and virtual worlds, real-time interaction, and 3D registration of virtual and real objects. A user of an AR system perceives virtual content that appears to be attached or interact with a real-world physical object.

The term "virtual reality" (VR) is used herein to refer to a simulation experience of a virtual world environment that is completely distinct from the real-world environment. Computer-generated digital content is displayed in the virtual world environment. VR also refers to a system that enables a user of a VR system to be completely immersed in the virtual world environment and to interact with virtual objects presented in the virtual world environment.

The term "AR application" is used herein to refer to a computer-operated application that enables an AR experience. The term "VR application" is used herein to refer to a computer-operated application that enables a VR experience. The term "AR/VR application" refers to a computer-operated application that enables a combination of an AR experience or a VR experience.

The term "visual tracking system" is used herein to refer to a computer-operated application or system that enables a system to track visual features identified in images captured by one or more cameras of the visual tracking system. The visual tracking system builds a model of a real-world environment based on the tracked visual features. Non-limiting examples of the visual tracking system include: a visual Simultaneous Localization and Mapping system (VSLAM), and Visual Inertial Odometry (VIO) system. VSLAM can be used to build a target from an environment, or a scene based on one or more cameras of the visual tracking system. VIO (also referred to as a visual-inertial tracking system, and visual odometry system) determines a latest pose (e.g., position and orientation) of a device based on data acquired from multiple sensors (e.g., optical sensors, inertial sensors) of the device.

The term "Inertial Measurement Unit" (IMU) is used herein to refer to a device that can report on the inertial status of a moving body including the acceleration, velocity, orientation, and position of the moving body. An IMU enables tracking of movement of a body by integrating the acceleration and the angular velocity measured by the IMU. IMU can also refer to a combination of accelerometers and gyroscopes that can determine and quantify linear acceleration and angular velocity, respectively. The values obtained from the IMUs gyroscopes can be processed to obtain the pitch, roll, and heading of the IMU and, therefore, of the body with which the IMU is associated. Signals from the IMU's accelerometers also can be processed to obtain velocity and displacement of the IMU.

Both AR and VR applications allow a user to access information, such as in the form of virtual content rendered in a display of an AR/VR display device (also referred to as a display device). The rendering of the virtual content may be based on a position of the display device relative to a physical object or relative to a frame of reference (external to the display device) so that the virtual content correctly appears in the display. For AR, the virtual content appears aligned with a physical object as perceived by the user and a camera of the AR display device. The virtual content appears to be attached to the physical world (e.g., a physical object of interest).

Displaying and aligning the virtual content within the physical world requires significant device computation power. In some examples, the AR display device detects the physical object and tracks a pose of the AR display device relative to a position of the physical object. A pose identifies a position and orientation of the display device relative to a frame of reference or relative to another object. For VR, the virtual object appears at a location based on the pose of the VR display device. The virtual content is therefore refreshed based on the latest pose of the device.

In order to improve the user experience for a user of the display device, the display device uses a low-power tracking system in conjunction with a high-power tracking system to determine the latest pose of the display device.

The present application describes an augmented reality system for ameliorating the perceived startup time of a six-degrees of freedom (6DOF) tracking system for augmented reality. The augmented reality system is composed of two parts: a high-power consumption 6DOF tracking system and a low-power consumption 3DOF tracking system. The 3DOF tracking system is used to mask the amount of time needed for the 6DOF tracking system to initialize and begin providing pose data so that the user can enjoy a complete augmented reality experience.

In one example, the augmented reality system continuously runs a low-power 3DOF tracking system. Once a user of the display device initiates a user experience that requires a 6DOF tracking system, the augmented reality system initiates the 6DOF tracking system in conjunction with the 3DOF tracking system. The 6DOF tracking system requires a non-negligible amount of time to activate its sensors and receive data from its sensors before it is able to provide pose data to the augmented reality system. The 3DOF tracking system thus masks out the time it takes for sensors of the 6DOF tracking system to start-up.

The 3DOF tracking system allows the augmented reality system to track rotational motion. For example, the 3DOF tracking system can track whether a user of the display device is looking left or right, rotating their head up or down, and pivoting left or right. The augmented reality system cannot use the 3DOF tracking system to determine whether the user has moved around the scene by moving in the physical world.

The 3DOF tracking system uses sensor data from the display device such as inertial measurement unit (IMU) sensors. For example, the 3DOF tracking system uses sensor data from sensors such as accelerometers, gyroscopes and magnetometers.

The 6DOF tracking system allows the augmented reality system to track rotational and translational motion. For example, the 6DOF tracking system can track whether the user has rotated their head and moved forward or backward, laterally or vertically and up or down.

The 6DOF tracking system may be a visual odometry system that relies on data acquired from multiple sensors (e.g., depth cameras, inertial sensors). The 6DOF tracking system analyzes data from the sensors to accurately determine the pose of the display device.

As a result, one or more of the methodologies described herein facilitate solving the technical problem of improving the startup time of a 6DOF tracking system used by an AR/VR device by operating a 3DOF tracking system prior to operating the 6DOF tracking system. The presently described method provides an improvement to an operation of the functioning of a computer by reducing power consumption of an AR/VR device when the device is in an idle state (e.g., when the user is not enjoying an experience that requires 6DOF tracking).

FIG. 1 is a network diagram illustrating an environment 100 suitable for operating an AR/VR display device 108, according to some example embodiments. The environment 100 includes a user 104, an AR/VR display device 108, and a physical object 106. A user 104 operates the AR/VR display device 108. The user 104 may be a human user (e.g., a human being), a machine user (e.g., a computer configured by a software program to interact with the AR/VR display device 108), or any suitable combination thereof (e.g., a human assisted by a machine or a machine supervised by a human). The user 104 is associated with the AR/VR display device 108.

The AR/VR display device 108 may be a computing device with a display such as a smartphone, a tablet computer, or a wearable computing device (e.g., watch or glasses). The computing device may be hand-held or may be removable mounted to a head of the user 104. In one example, the display includes a screen that displays images captured with a camera of the AR/VR display device 108. In another example, the display of the device may be transparent such as in lenses of wearable computing glasses. In other examples, the display may be non-transparent, partially transparent, partially opaque. In yet other examples, the display may be wearable by the user 104 to cover the field of vision of the user 104.

The AR/VR display device 108 includes an augmented reality system 114 that generates virtual content based on images detected with the camera of the AR/VR display device 108. For example, the user 104 may point a camera of the AR/VR display device 108 to capture an image of the physical object 106. The augmented reality system 114 generates virtual content corresponding to an identified object (e.g., physical object 106) in the image and presents the virtual content in a display of the AR/VR display device 108. In another example, the augmented reality system 114 generates virtual content and presents the virtual content in a display of the AR/VR display device 108 relative to a frame of reference (external to the display device) so that the virtual content correctly appears in the display The augmented reality system 114 includes a low power tracking system 112 and a high power tracking system 110. The low power tracking system 112 tracks the pose (e.g., position and orientation) of the AR/VR display device 108 relative to the real-world environment 102 using IMU sensors (e.g., accelerometer, gyroscope and magnetometer) without using data from the optical sensors 212 (e.g., in other words, the optical sensors 212 are not in operation while in the lower power mode of the low power tracking system 112).

The high power tracking system 110 tracks the pose of the AR/VR display device 108 relative to the real-world environment 102 using, for example, optical sensors (e.g., depth-enabled 3D camera, image camera), inertia sensors (e.g., gyroscope, accelerometer), wireless sensors (Bluetooth, Wi-Fi), GPS sensor, and audio sensor. In one example, the AR/VR display device 108 displays virtual content based on the pose of the AR/VR display device 108 relative to the real-world environment 102 and/or the physical object 106.

Any of the machines, databases, or devices shown in FIG. 1 may be implemented in a general-purpose computer modified (e.g., configured or programmed) by software to be a special-purpose computer to perform one or more of the functions described herein for that machine, database, or device. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The AR/VR display device 108 may operate over a computer network. The computer network may be any network that enables communication between or among machines, databases, and devices. Accordingly, the computer network may be a wired network, a wireless network (e.g., a mobile or cellular network), or any suitable combination thereof. The computer network may include one or more portions that constitute a private network, a public network (e.g., the Internet), or any suitable combination thereof.

Figure 2:
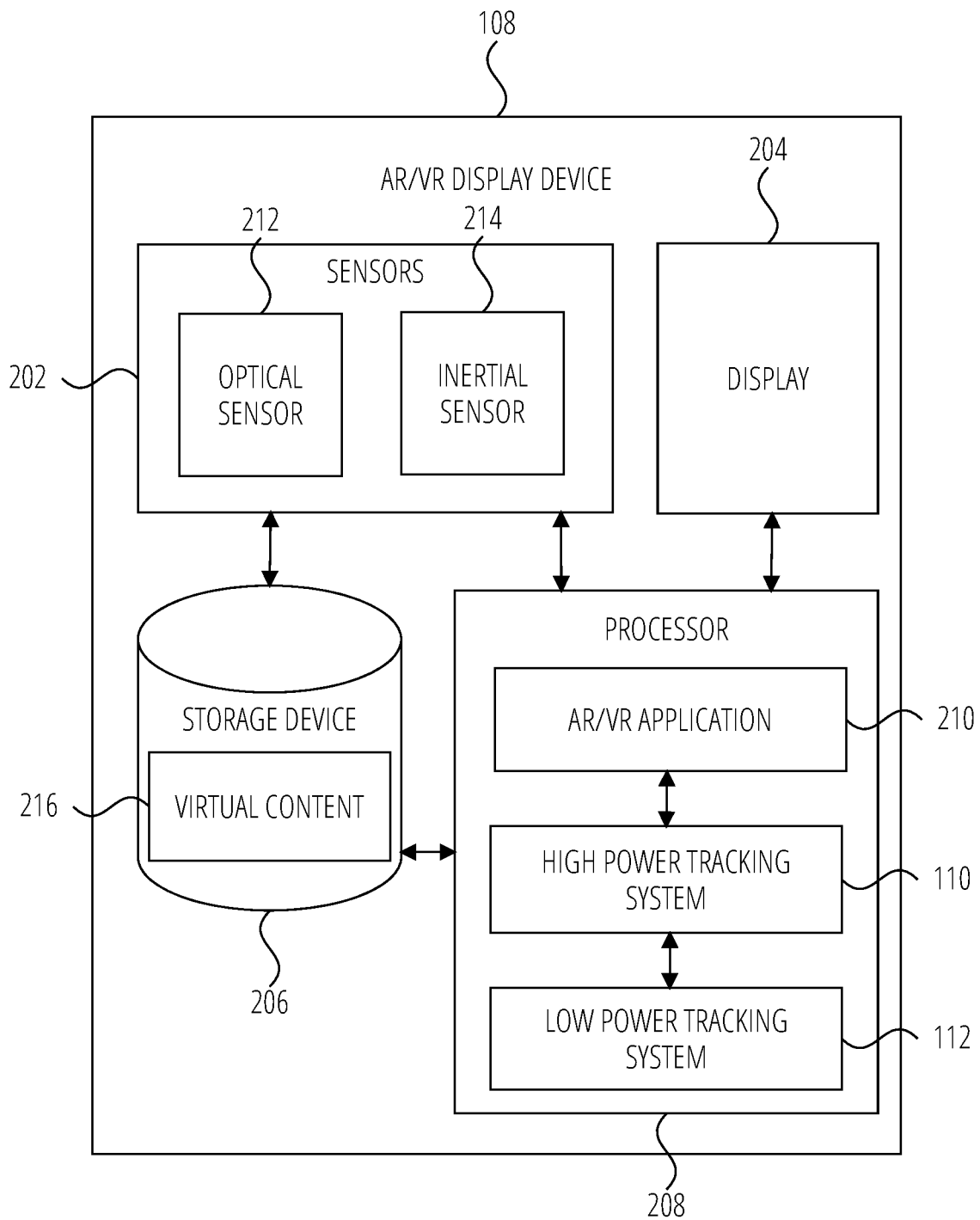
FIG. 2 is a block diagram illustrating an AR/VR display device in accordance with one example embodiment.

FIG. 2 is a block diagram illustrating modules (e.g., components) of the AR/VR display device 108, according to some example embodiments. The AR/VR display device 108 includes sensors 202, a display 204, a processor 208, and a storage device 206. Examples of AR/VR display device 108 include a wearable computing device, a mobile computing device, a navigational device, a portable media device, or a smart phone.

The sensors 202 include, for example, an optical sensor 212 (e.g., camera such as a color camera, a thermal camera, a depth sensor and one or multiple grayscale, global/rolling shutter tracking cameras) and an inertial sensor 214 (e.g., gyroscope, accelerometer). Other examples of sensors 202 include a proximity or location sensor (e.g., near field communication, GPS, Bluetooth, Wifi), an audio sensor (e.g., a microphone), or any suitable combination thereof. It is noted that the sensors 202 described herein are for illustration purposes and the sensors 202 are thus not limited to the ones described above.

The display 204 includes a screen or monitor configured to display images generated by the processor 208. In one example embodiment, the display 204 may be transparent or semi-opaque so that the user 104 can see through the display 204 (in AR use case). In another example embodiment, the display 204 covers the eyes of the user 104 and blocks out the entire field of view of the user 104 (in VR use case). In another example, the display 204 includes a touchscreen display configured to receive a user input via a contact on the touchscreen display.

The processor 208 includes an AR/VR application 210, a low power tracking system 112, and a high power tracking system 110. The AR/VR application 210 detects and identifies a physical environment or the physical object 106 using computer vision. The AR/VR application 210 retrieves virtual content (e.g., 3D object model) based on the identified physical object 106 or physical environment. The AR/VR application 210 renders the virtual object in the display 204. In one example embodiment, the AR/VR application 210 includes a local rendering engine that generates a visualization of virtual content overlaid (e.g., superimposed upon, or otherwise displayed in tandem with) on an image of the physical object 106 captured by the optical sensor 212. A visualization of the virtual content may be manipulated by adjusting a position of the physical object 106 (e.g., its physical location, orientation, or both) relative to the optical sensor 212. Similarly, the visualization of the virtual content may be manipulated by adjusting a pose of the AR/VR display device 108 relative to the physical object 106. For a AR application, the AR/VR application 210 displays the virtual content in the display 204 at a location (in the display 204) determined based on a pose of the AR/VR display device 108.

The low power tracking system 112 captures rotational motion data of the AR/VR display device 108 using sensor data from IMU sensors (e.g., the inertial sensor 214). When the AR/VR application 210 operates, the low power tracking system 112 may be referred to as online. When the AR/VR application 210 stops operating, the low power tracking system 112 may be referred to as offline.

The high power tracking system 110 captures rotational and translational motion data of the AR/VR display device 108. For example, the high power tracking system 110 uses image data and corresponding inertial data from the optical sensor 212 and the inertial sensor 214 to track a location and pose of the AR/VR display device 108 relative to a frame of reference (e.g., real-world environment 102).

In one example embodiment, at least one of the low power tracking system 112 and the high power tracking system 110 operate independently and asynchronously from the AR/VR application 210. For example, the low power tracking system 112 and the high power tracking system 110 operate offline without receiving any tracking request from the AR/VR application 210. In another example, at least one of the low power tracking system 112 and the high power tracking system 110 operate periodically (e.g., every n seconds, m minutes) regardless of whether the AR/VR application 210 is running at the AR/VR display device 108.

In one example embodiment, instead of running the high power tracking system 110 continuously or instead of only running the high power tracking system 110 when requested by the AR/VR application 210, the low power tracking system 112 starts running when the AR/VR display device 108 is powered on. The low power tracking system 112 runs until a user requests to launch the AR/VR application 210. Once the AR/VR application 210 is launched, the low power tracking system 112 and the high power tracking system 110 are run, concurrently.

The storage device 206 stores virtual content 216. The virtual content 216 includes, for example, a database of visual references (e.g., images of physical objects) and corresponding experiences (e.g., three-dimensional virtual object models).

Other augmentation data that may be stored within the storage device 206 includes augmented reality content items (e.g., corresponding to applying Lenses or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of an AR/VR display device 108 and then displayed on a screen of the AR/VR display device 108 with the modifications. This also includes modifications to stored content, such as video clips in a gallery that may be modified. For example, in a AR/VR display device 108 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a AR/VR display device 108 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the AR/VR display device 108) and perform complex image manipulations locally on the AR/VR display device 108 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the AR/VR display device 108.

In some examples, a computer animation model to transform image data can be used by a system where a user may capture an image or video stream of the user (e.g., a selfie) using an AR/VR display device 108 having a neural network operating as part of a AR/VR application 210 operating on the AR/VR display device 108. The transformation system operating within the AR/VR application 210 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the AR/VR display device 108 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

Any one or more of the modules described herein may be implemented using hardware (e.g., a Processor of a machine) or a combination of hardware and software. For example, any module described herein may configure a Processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
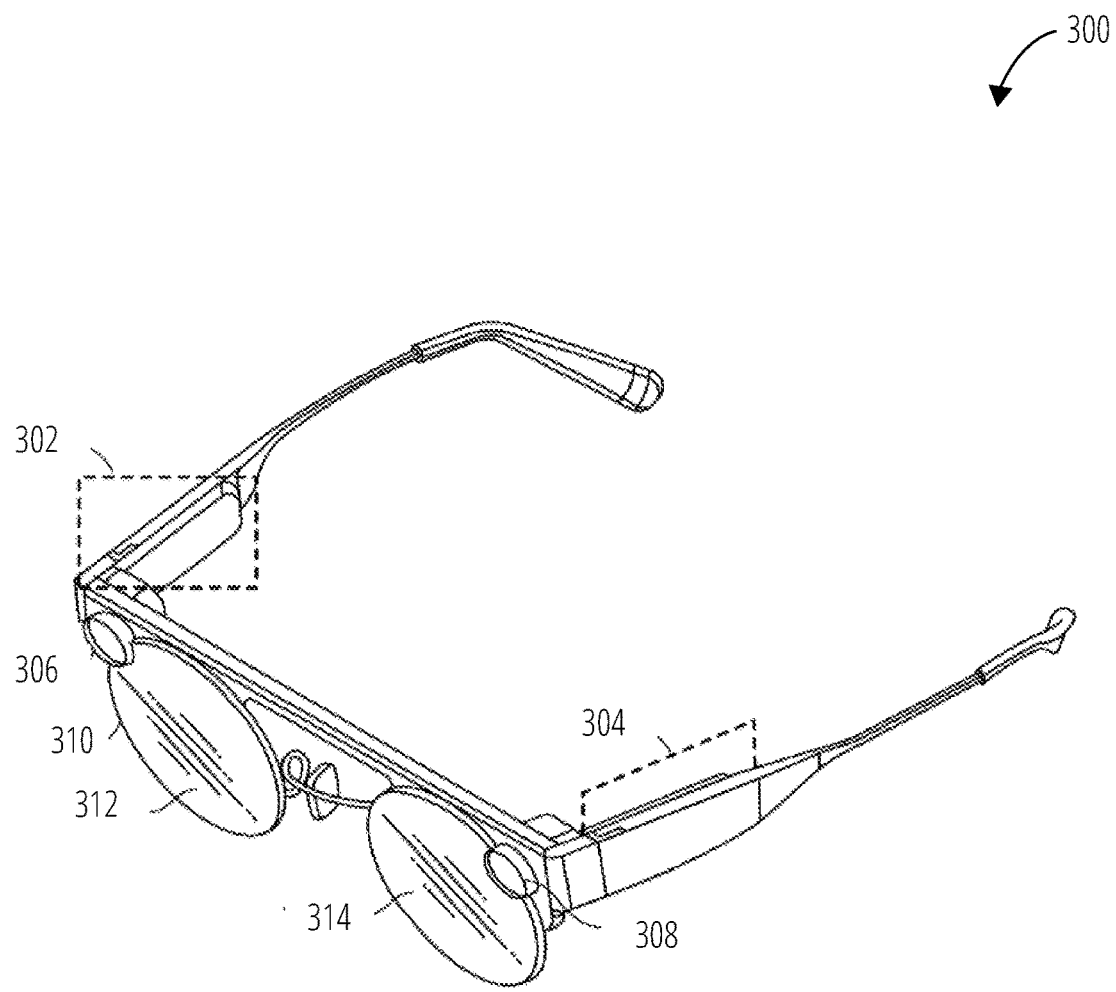
FIG. 3 illustrates a head-wearable apparatus 300, according to one example embodiment

FIG. 3 illustrates a head-wearable apparatus 300, according to one example embodiment. FIG. 3 illustrates a perspective view of the head-wearable apparatus 300 according to one example embodiment. In some examples, the AR/VR display device 108 may be the head-wearable apparatus 300.

In FIG. 3, the head-wearable apparatus 300 is a pair of eyeglasses. In some embodiments, the head-wearable apparatus 300 can be sunglasses or goggles. Some embodiments can include one or more wearable devices, such as a pendant with an integrated camera that is integrated with, in communication with, or coupled to, the head-wearable apparatus 300 or an AR/VR display device 108. Any desired wearable device may be used in conjunction with the embodiments of the present disclosure, such as a watch, a headset, a wristband, earbuds, clothing (such as a hat or jacket with integrated electronics), a clip-on electronic device, or any other wearable devices. It is understood that, while not shown, one or more portions of the system included in the head-wearable apparatus 300 can be included in an AR/VR display device 108 that can be used in conjunction with the head-wearable apparatus 300.

In FIG. 3, the head-wearable apparatus 300 is a pair of eyeglasses that includes a frame 310 that includes eye wires (or rims) that are coupled to two stems (or temples), respectively, via hinges and/or end pieces. The eye wires of the frame 310 carry or hold a pair of lenses (e.g., lens 312 and lens 314). The frame 310 includes a first (e.g., right) side that is coupled to the first stem and a second (e.g., left) side that is coupled to the second stem. The first side is opposite the second side of the frame 310.

The head-wearable apparatus 300 further includes a camera module (not shown) that includes camera lenses (e.g., camera lens 306, camera lens 308) and at least one image sensor. The camera lens 306 and camera lens 308 may be a perspective camera lens or a non-perspective camera lens. A non-perspective camera lens may be, for example, a fisheye lens, a wide-angle lens, an omnidirectional lens, etc. The image sensor captures digital video through the camera lens 306 and camera lens 308. The images may be also be still image frame or a video including a plurality of still image frames. The camera module can be coupled to the frame 310. As shown in FIG. 3, the frame 310 is coupled to the camera lens 306 and camera lens 308 such that the camera lenses (e.g., camera lens 306, camera lens 308) face forward. The camera lens 306 and camera lens 308 can be perpendicular to the lens 312 and lens 314. The camera module can include dual-front facing cameras that are separated by the width of the frame 310 or the width of the head of the user of the head-wearable apparatus 300.

In FIG. 3, the two stems (or temples) are respectively coupled to microphone housing 302 and microphone housing 304. The first and second stems are coupled to opposite sides of a frame 310 of the head-wearable apparatus 300. The first stem is coupled to the first microphone housing 302 and the second stem is coupled to the second microphone housing 304. The microphone housing 302 and microphone housing 304 can be coupled to the stems between the locations of the frame 310 and the temple tips. The microphone housing 302 and microphone housing 304 can be located on either side of the user's temples when the user is wearing the head-wearable apparatus 300.

As shown in FIG. 3, the microphone housing 302 and microphone housing 304 encase a plurality of microphones (not shown). The microphones are air interface sound pickup devices that convert sound into an electrical signal. More specifically, the microphones are transducers that convert acoustic pressure into electrical signals (e.g., acoustic signals). Microphones can be digital or analog microelectromechanical systems (MEMS) microphones. The acoustic signals generated by the microphones can be pulse density modulation (PDM) signals.

Figure 4:
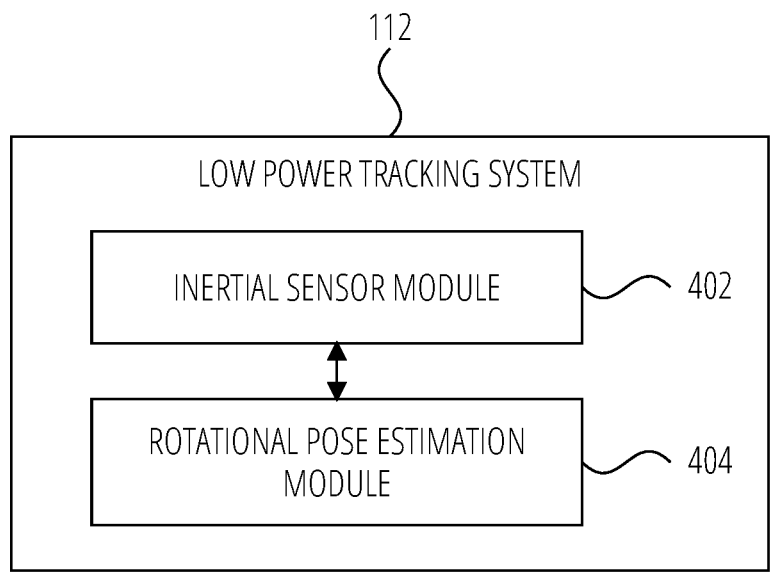
FIG. 4 is a block diagram illustrating a low power tracking system in accordance with one example embodiment.

FIG. 4 is a block diagram illustrating a low power tracking system 112 in accordance with one example embodiment. The low power tracking system 112 includes an inertial sensor module 402 and a rotational pose estimation module 404.

The low power tracking system 112 may be a 3DOF tracking system. The inertial sensor module 402 captures sensor data from the inertial sensor 214. The sensor data captured by the inertial sensor 214 may include accelerometer data, gyroscope data and magnetometer data.

The rotational pose estimation module 404 determines a pose (e.g., location, position, orientation) of the AR/VR display device 108 relative to a frame of reference (e.g., real-world environment 102) based on the data received by the inertial sensor module 402.

Figure 5:
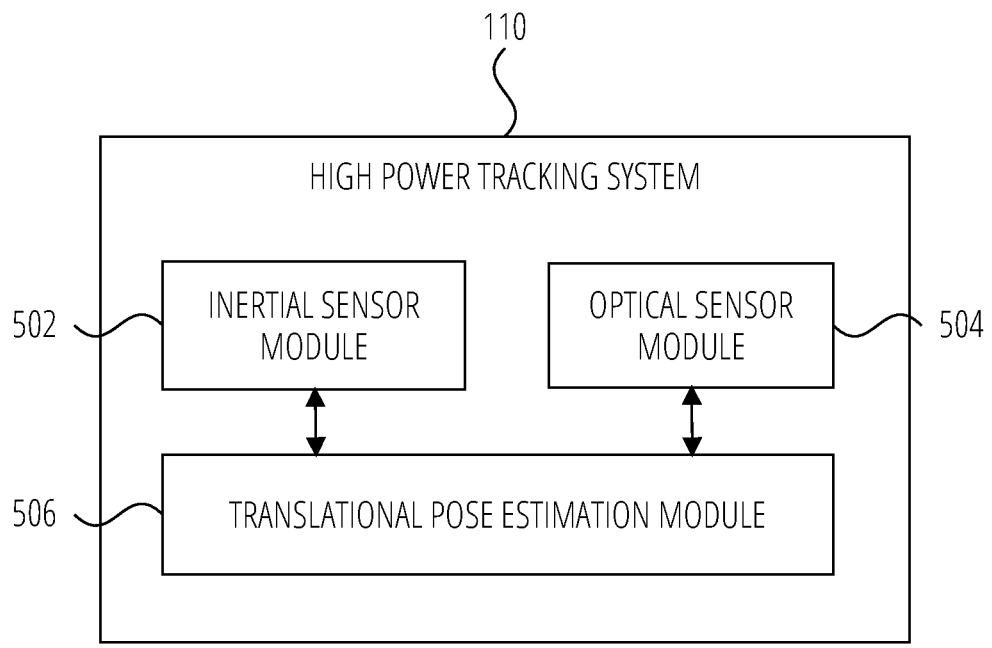
FIG. 5 is a block diagram illustrating a high power tracking system in accordance with one example embodiment.

FIG. 5 illustrates the high power tracking system 110 in accordance with one example embodiment. The high power tracking system 110 includes, for example, an inertial sensor module 502, an optical sensor module 504, and a translational pose estimation module 506. The inertial sensor module 502 accesses inertial sensor data from the inertial sensor 214. The optical sensor module 504 accesses optical sensor data from the optical sensor 212. The high power tracking system 110 may be a 6DOF tracking system.

The translational pose estimation module 506 determines a pose (e.g., location, position, orientation) of the AR/VR display device 108 relative to a frame of reference (e.g., real-world environment 102). In one example embodiment, the translational pose estimation module 506 includes a visual odometry system that estimates the pose of the AR/VR display device 108 based on 3D maps of feature points from images captured with the optical sensor 212 and the inertial sensor data captured with the inertial sensor 214. The optical sensor module 504 accesses image data from the optical sensor 212.

In one example embodiment, the translational pose estimation module 506 computes the position and orientation of the AR/VR display device 108. The AR/VR display device 108 includes one or more optical sensor 212 mounted on a rigid platform (a frame of the AR/VR display device 108) with one or more inertial sensor 214. The optical sensor 212 can be mounted with non-overlapping (distributed aperture) or overlapping (stereo or more) fields-of-view.

In some example embodiments, the translational pose estimation module 506 includes an algorithm that combines inertial information from the inertial sensor 214 and image information from the optical sensor 212 that are coupled to a rigid platform (e.g., AR/VR display device 108) or a rig. In one embodiment, a rig may consist of multiple cameras mounted on a rigid platform with an inertial navigation unit (e.g., inertial sensor 214). A rig may thus have at least one inertial navigation unit and at least one camera.

Although the described flowcharts below can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

Figure 6:
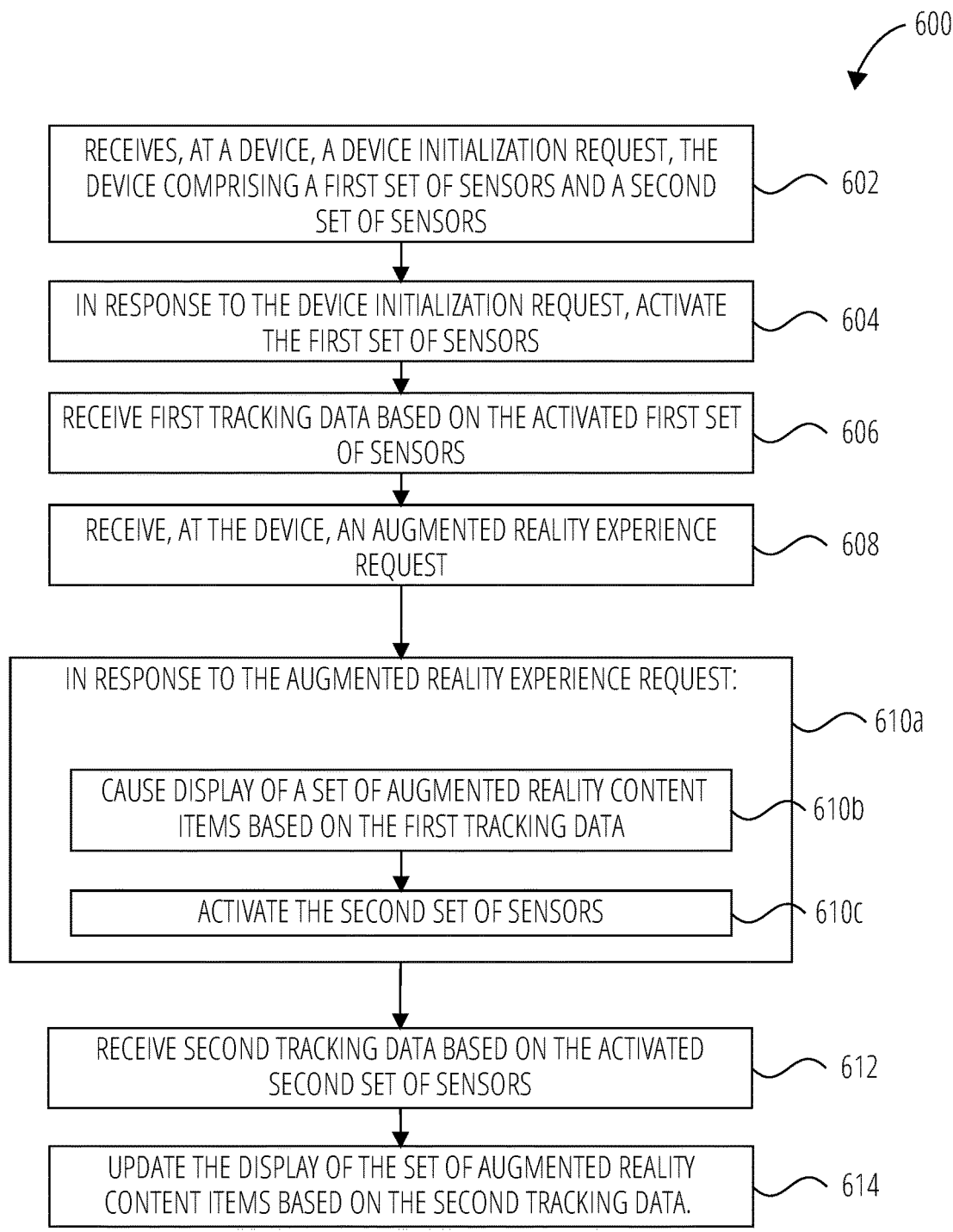
FIG. 6 illustrates a method for improving a perceived startup time of a tracking system for augmented reality in accordance with one example embodiment.

FIG. 6 is a flowchart illustrating a method 600 in accordance with one example embodiment. Operations of the method 600 may be performed by the augmented reality system 114. In one example, the processor in an augmented reality system 114, the processor in an AR/VR display device 108 or any combination thereof, can perform the operations in the method 600.

At operation 602, the augmented reality system 114 receives, at a device, a device initialization request. The device initialization request may be an indication that the user 104 has opened an AR/VR application 210. The device may be an AR/VR display device 108. In some examples, the device initialization request may be an indication that the user 104 has powered on the AR/VR display device 108. The AR/VR display device 108 comprises a first set of sensors and a second set of sensors. The first set of sensors may include sensors from the inertial sensor module 402. The second set of sensors may include sensors from the inertial sensor module 502 and the optical sensor module 504.

At operation 604, in response to the device initialization request, the augmented reality system 114 activates the first set of sensors. For example, the augmented reality system 114 activates the low power tracking system 112 by turning on the inertial sensor module 402.

At operation 606, the augmented reality system 114 receives first tracking data based on the activated first set of sensors. For example, the first tracking data may be rotational pose data received by the rotational pose estimation module 404.

At operation 608, the augmented reality system 114 receives, at the device, an augmented reality experience request. The augmented reality experience request may be initiated by a user 104.

At operation 610a, in response to the augmented reality experience request, the augmented reality system 114 performs operations 610*b* and 610*c*. Operations 610*b* and 610*c* may be performed simultaneously or consecutively. At operation 610*b*, the augmented reality system 114 causes display, at the device, of a set of augmented reality content items based on the first tracking data. At operation 610*c*, the augmented reality system 114 activates the second set of sensors. For example, the augmented reality system 114 activates the high power tracking system 110 by turning on the inertial sensor module 502 and the optical sensor module 504.

At operation 612, the augmented reality system 114 receives second tracking data based on the activated second set of sensors. In some examples there is a non-negligible amount of time between operations 610*c* and 612. Thus, the display of the set of augmented reality content items based on the first tracking data at operation 610*b* by the low-power tracking system 112, masks out the time needed by the high-power tracking system 110 to activate its sensors and receive pose data. This allows for the user to enjoy an uninterrupted augmented reality experience.

The second tracking data may be rotational and translational pose data received by the translational pose estimation module 506. The second tracking data may include image frames received by the optical sensor module 504. In some examples, the second tracking data also includes the first tracking data.

At operation 614, the augmented reality system 114 updates the set of augmented reality content items based on the second tracking data. For example, the set of augmented reality content items may include virtual content 216. The transition from displaying the set of augmented reality content items using only the low-power tracking system 112 (at operation 610*b*) to using the both the low-power tracking system 112 and the high-power tracking system 110 (at operation 614) is a seamless transition. For example, updating the display at operation 614 does not interrupt the user experience of a user of the AR/VR display device 108.

Figure 7:
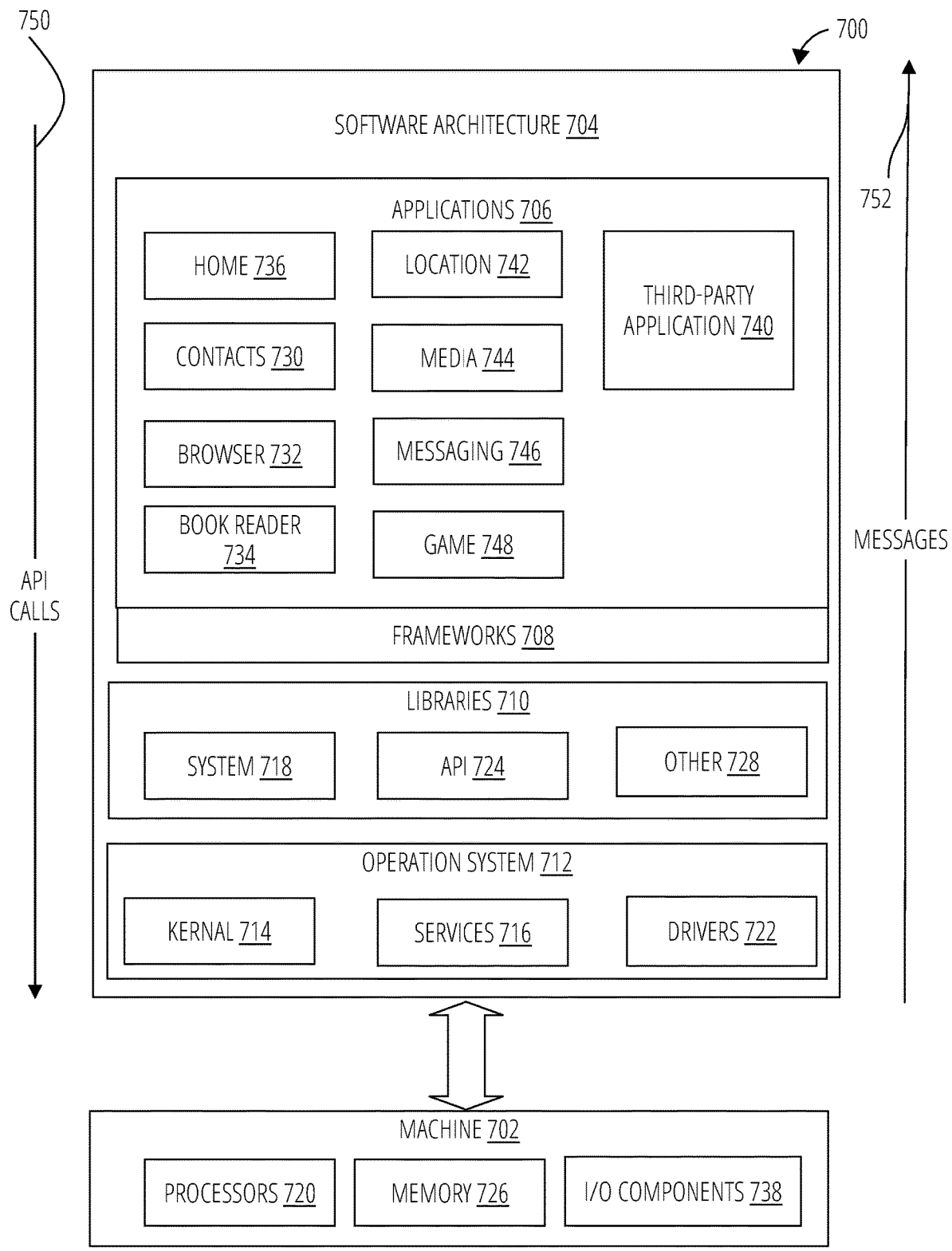
FIG. 7 is block diagram showing a software architecture within which the present disclosure may be implemented, according to an example embodiment.

FIG. 7 is a block diagram 700 illustrating a software architecture 704, which can be installed on any one or more of the devices described herein. The software architecture 704 is supported by hardware such as a 702 that includes processors 720, memory 726, and I/O components 738. In this example, the software architecture 704 can be conceptualized as a stack of layers, where each layer provides a particular functionality. The software architecture 704 includes layers such as an operation system 712, libraries 710, frameworks 708, and applications 706. Operationally, the applications 706 invoke API calls 750 through the software stack and receive messages 752 in response to the API calls 750.

The operation system 712 manages hardware resources and provides common services. The operation system 712 includes, for example, a kernal 714, services 716, and drivers 722. The kernal 714 acts as an abstraction layer between the hardware and the other software layers. For example, the kernal 714 provides memory management, Processor management (e.g., scheduling), Component management, networking, and security settings, among other functionalities. The services 716 can provide other common services for the other software layers. The drivers 722 are responsible for controlling or interfacing with the underlying hardware. For instance, the drivers 722 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 710 provide a low-level common infrastructure used by the applications 706. The libraries 710 can include 718 (e.g., C standard library) that provide functions such as memory allocation functions, string manipulation functions, mathematic functions, and the like. In addition, the libraries 710 can include 724 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 710 can also include a wide variety of 728 to provide many other APIs to the applications 706.

The frameworks 708 provide a high-level common infrastructure that is used by the applications 706. For example, the frameworks 708 provide various graphical user interface (GUI) functions, high-level resource management, and high-level location services. The frameworks 708 can provide a broad spectrum of other APIs that can be used by the applications 706, some of which may be specific to a particular operating system or platform.

In an example embodiment, the applications 706 may include a 736, a 730, a 732, a 734, a 742, a 744, a 746, a 748, and a broad assortment of other applications such as a third-party application 740. The applications 706 are programs that execute functions defined in the programs. Various programming languages can be employed to create one or more of the applications 706, structured in a variety of manners, such as object-oriented programming languages (e.g., Objective-C, Java, or C++) or procedural programming languages (e.g., C or assembly language). In a specific example, the third-party application 740 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 740 can invoke the API calls 750 provided by the operation system 712 to facilitate functionality described herein.

Figure 8:
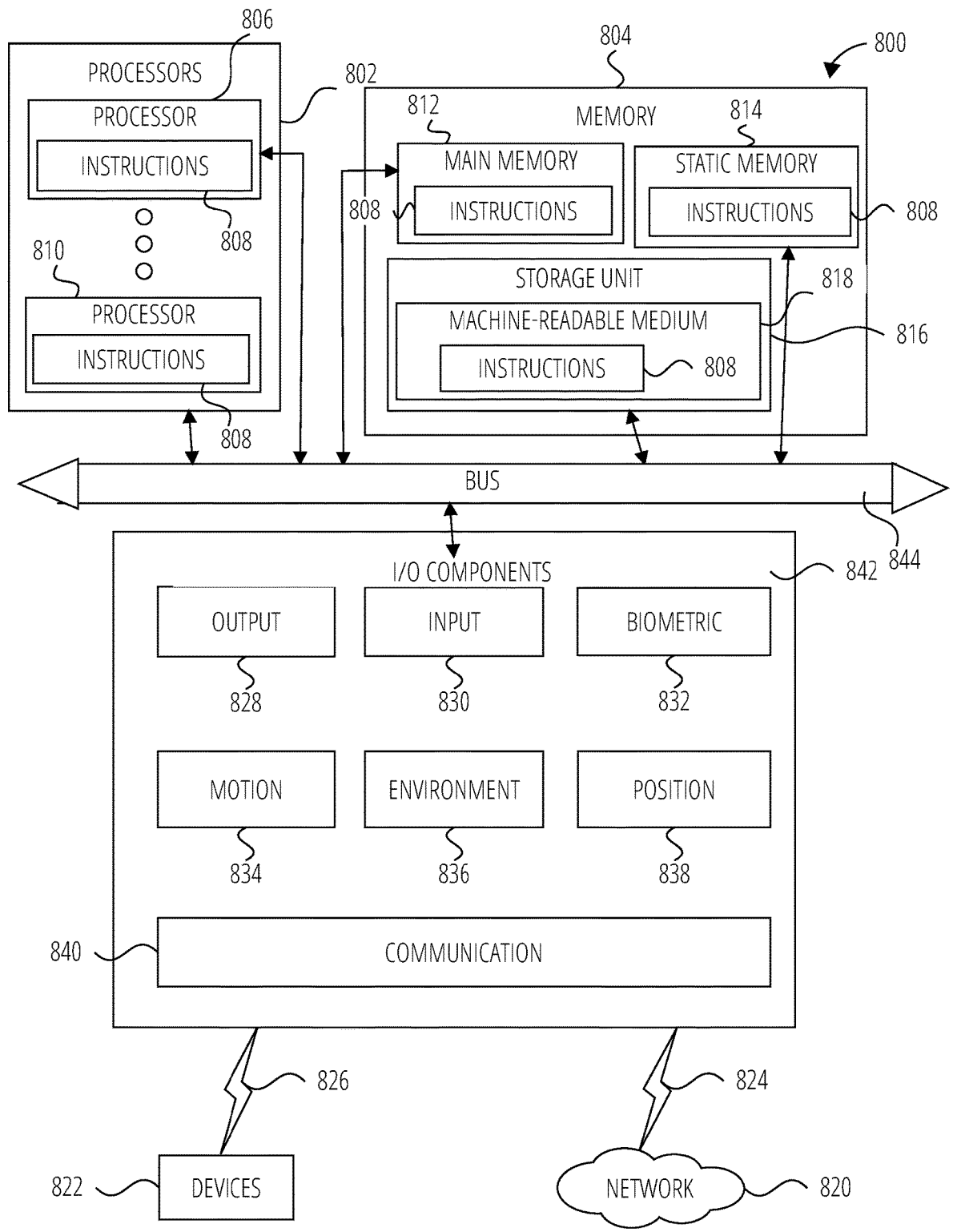
FIG. 8 is a diagrammatic representation of a machine in the form of a computer system within which a set of instructions may be executed for causing the machine to perform any one or more of the methodologies discussed herein, according to one example embodiment.

FIG. 8 is a diagrammatic representation of the 800 within which instructions 808 (e.g., software, a program, an application, an applet, an app, or other executable code) for causing the 800 to perform any one or more of the methodologies discussed herein may be executed. For example, the instructions 808 may cause the 800 to execute any one or more of the methods described herein. The instructions 808 transform the general, non-programmed 800 into a particular 800 programmed to carry out the described and illustrated functions in the manner described. The 800 may operate as a standalone device or may be coupled (e.g., networked) to other machines. In a networked deployment, the 800 may operate in the capacity of a server machine or a client machine in a server-client network environment, or as a peer machine in a peer-to-peer (or distributed) network environment. The 800 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 808, sequentially or otherwise, that specify actions to be taken by the 800. Further, while only a single 800 is illustrated, the term "machine" shall also be taken to include a collection of machines that individually or jointly execute the instructions 808 to perform any one or more of the methodologies discussed herein.

The 800 may include processors 802, memory 804, and I/O components 842, which may be configured to communicate with each other via an 844. In an example embodiment, the processors 802 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an ASIC, a Radio-Frequency Integrated Circuit (RFIC), another Processor, or any suitable combination thereof) may include, for example, a processor 806 and a processor 810 that execute the instructions 808. The term "Processor" is intended to include multi-core Processors that may comprise two or more independent Processors (sometimes referred to as "cores") that may execute instructions contemporaneously. Although FIG. 8 shows multiple processors 802, the 800 may include a single Processor with a single core, a single Processor with multiple cores (e.g., a multi-core Processor), multiple Processors with a single core, multiple Processors with multiples cores, or any combination thereof.

The memory 804 includes a main memory 812, a static memory 814, and a storage unit 816, both accessible to the processors 802 via the 844. The main memory 804, the static memory 814, and storage unit 816 store the instructions 808 embodying any one or more of the methodologies or functions described herein. The instructions 808 may also reside, completely or partially, within the main memory 812, within the static memory 814, within machine-readable medium 818 within the storage unit 816, within at least one of the processors 802 (e.g., within the Processor's cache memory), or any suitable combination thereof, during execution thereof by the 800.

The I/O components 842 may include a wide variety of Components to receive input, provide output, produce output, transmit information, exchange information, capture measurements, and so on. The specific I/O components 842 that are included in a particular machine will depend on the type of machine. For example, portable machines such as mobile phones may include a touch input device or other such input mechanisms, while a headless server machine will likely not include such a touch input device. It will be appreciated that the I/O components 842 may include many other Components that are not shown in FIG. 8. In various example embodiments, the I/O components 842 may include 828 and 830. The 828 may include visual Components (e.g., a display such as a plasma display panel (PDP), a light emitting diode (LED) display, a liquid crystal display (LCD), a projector, or a cathode ray tube (CRT)), acoustic Components (e.g., speakers), haptic Components (e.g., a vibratory motor, resistance mechanisms), other signal generators, and so forth. The 830 may include alphanumeric input Components (e.g., a keyboard, a touch screen configured to receive alphanumeric input, a photo-optical keyboard, or other alphanumeric input Components), point-based input Components (e.g., a mouse, a touchpad, a trackball, a joystick, a motion sensor, or another pointing instrument), tactile input Components (e.g., a physical button, a touch screen that provides location and/or force of touches or touch gestures, or other tactile input Components), audio input Components (e.g., a microphone), and the like.

In further example embodiments, the I/O components 842 may include 832, 834, 836, or 838, among a wide array of other Components. For example, the 832 include Components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The 834 include acceleration sensor Components (e.g., accelerometer), gravitation sensor Components, rotation sensor Components (e.g., gyroscope), and so forth. The 836 include, for example, illumination sensor Components (e.g., photometer), temperature sensor Components (e.g., one or more thermometers that detect ambient temperature), humidity sensor Components, pressure sensor Components (e.g., barometer), acoustic sensor Components (e.g., one or more microphones that detect background noise), proximity sensor Components (e.g., infrared sensors that detect nearby objects), gas sensors (e.g., gas detection sensors to detection concentrations of hazardous gases for safety or to measure pollutants in the atmosphere), or other Components that may provide indications, measurements, or signals corresponding to a surrounding physical environment. The 838 include location sensor Components (e.g., a GPS receiver Component), altitude sensor Components (e.g., altimeters or barometers that detect air pressure from which altitude may be derived), orientation sensor Components (e.g., magnetometers), and the like.

Communication may be implemented using a wide variety of technologies. The I/O components 842 further include 840 operable to couple the 800 to a network 820 or devices 822 via an 824 and an 826, respectively. For example, the 840 may include a network interface Component or another suitable device to interface with the network 820. In further examples, the 840 may include wired communication Components, wireless communication Components, cellular communication Components, Near Field Communication (NFC) Components, Bluetooth® Components (e.g., Bluetooth® Low Energy), Wi-Fi® Components, and other communication Components to provide communication via other modalities. The devices 822 may be another machine or any of a wide variety of peripheral devices (e.g., a peripheral device coupled via a USB).

Moreover, the 840 may detect identifiers or include Components operable to detect identifiers. For example, the 840 may include Radio Frequency Identification (RFID) tag reader Components, NFC smart tag detection Components, optical reader Components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection Components (e.g., microphones to identify tagged audio signals). In addition, a variety of information may be derived via the 840, such as location via Internet Protocol (IP) geolocation, location via Wi-Fi® signal triangulation, location via detecting an NFC beacon signal that may indicate a particular location, and so forth.

The various memories (e.g., memory 804, main memory 812, static memory 814, and/or memory of the processors 802) and/or storage unit 816 may store one or more sets of instructions and data structures (e.g., software) embodying or used by any one or more of the methodologies or functions described herein. These instructions (e.g., the instructions 808), when executed by processors 802, cause various operations to implement the disclosed embodiments.

The instructions 808 may be transmitted or received over the network 820, using a transmission medium, via a network interface device (e.g., a network interface Component included in the 840) and using any one of a number of well-known transfer protocols (e.g., hypertext transfer protocol (HTTP)). Similarly, the instructions 808 may be transmitted or received using a transmission medium via the 826 (e.g., a peer-to-peer coupling) to the devices 822.

System with Head-Wearable Apparatus

Figure 9:
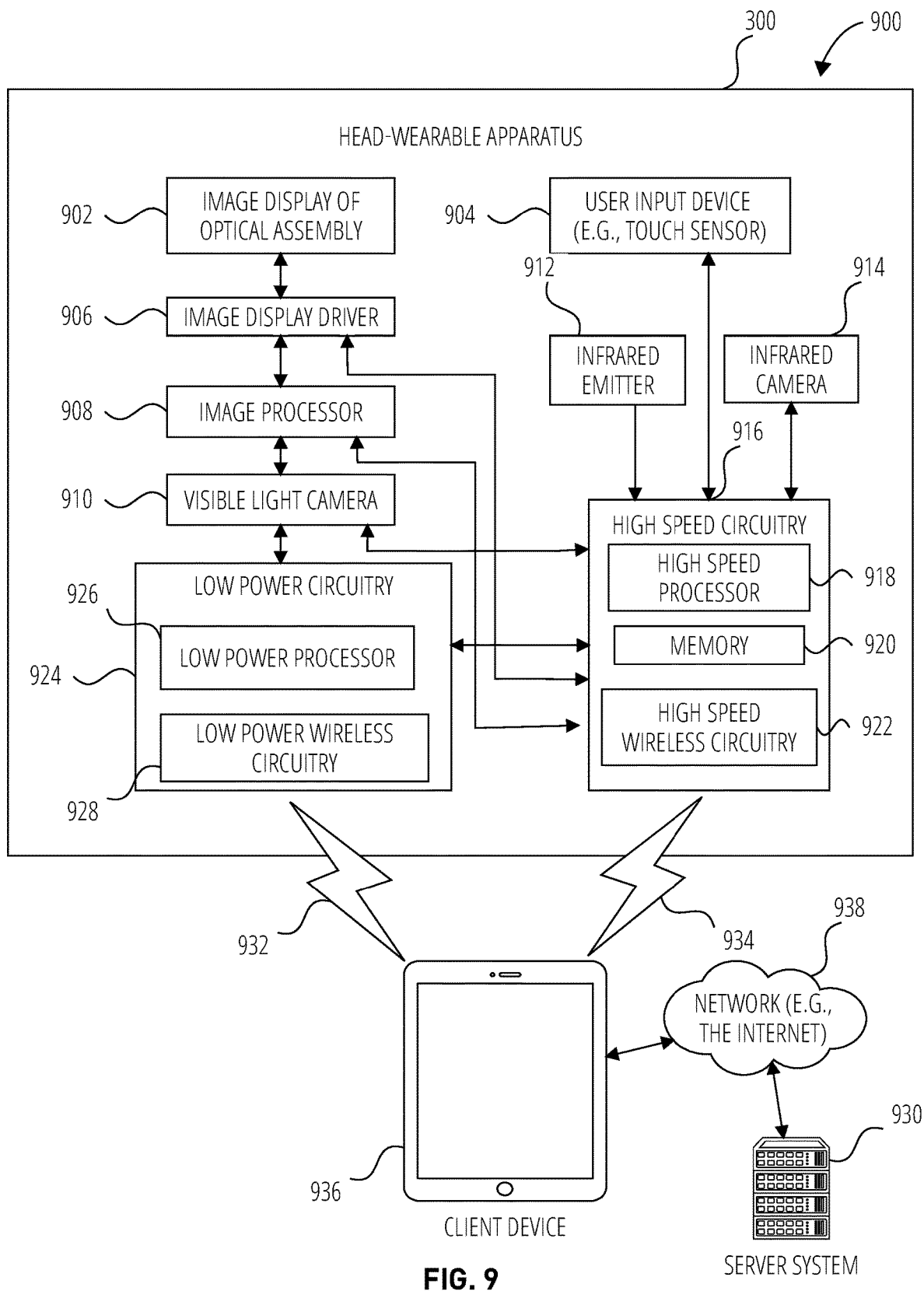
FIG. 9 illustrates a system in which the head-wearable apparatus 300 can be implemented according to one example embodiment.

FIG. 9 illustrates a 900 in which the head-wearable apparatus 300 can be implemented according to one example embodiment. FIG. 9 is a high-level functional block diagram of an example head-wearable apparatus 300 communicatively coupled a mobile client device 936 and a server system 930 via various network 938.

The head-wearable apparatus 300 includes a camera, such as at least one of visible light camera 910, infrared emitter 912 and infrared camera 914. The camera can include the camera module with the camera lens 306 and camera lens 308 in FIG. 3.

Client device 936 can be capable of connecting with head-wearable apparatus 300 using both a wireless network 932 and a wireless network 934. client device 936 is connected to server system 930 and network 938. The network 938 may include any combination of wired and wireless connections.

further includes two image displays of the image display of optical assembly 902. The two include one associated with the left lateral side and one associated with the right lateral side of the head-wearable apparatus 300. head-wearable apparatus 300 also includes image display driver 906, image processor 908, low-power low power circuitry 924, and high speed circuitry 916. image display of optical assembly 902 are for presenting images and videos, including an image that can include a graphical user interface to a user of the head-wearable apparatus 300.

The image display driver 906 commands and controls the image display of the image display of optical assembly 902. image display driver 906 may deliver image data directly to the image display of the image display of optical assembly 902 for presentation or may have to convert the image data into a signal or data format suitable for delivery to the image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (Exif) or the like.

As noted above, head-wearable apparatus 300 includes a frame 310 and stems (or temples) extending from a lateral side of the frame 310. head-wearable apparatus 300 further includes a 904 (e.g., touch sensor or push button) including an input surface on the head-wearable apparatus 300. The 904 (e.g., touch sensor or push button) is to receive from the user an input selection to manipulate the graphical user interface of the presented image.

The components shown in FIG. 9 for the head-wearable apparatus 300 are located on one or more circuit boards, for example a PCB or flexible PCB, in the rims or temples. Alternatively or additionally, the depicted components can be located in the chunks, frames, hinges, or bridge of the head-wearable apparatus 300. Left and right can include digital camera elements such as a complementary metal-oxide-semiconductor (CMOS) image sensor, charge coupled device, a camera lens 306 and camera lens 308, or any other respective visible or light capturing elements that may be used to capture data, including images of scenes with unknown objects.

The head-wearable apparatus 300 includes a memory 920 which stores instructions to perform a subset or all of the functions described herein. The memory 920 can also include storage device.

As shown in FIG. 9, high speed circuitry 916 includes high speed processor 918, memory 920, and high speed wireless circuitry 922. In the example, the image display driver 906 is coupled to the high speed circuitry 916 and operated by the high speed processor 918 in order to drive the left and right image displays of the image display of optical assembly 902. high speed processor 918 may be any processor capable of managing high-speed communications and operation of any general computing system needed for head-wearable apparatus 300. high speed processor 918 includes processing resources needed for managing high-speed data transfers on wireless network 934 to a wireless local area network (WLAN) using high speed wireless circuitry 922. In certain examples, the high speed processor 918 executes an operating system such as a LINUX operating system or other such operating system of the head-wearable apparatus 300 and the operating system is stored in memory 920 for execution. In addition to any other responsibilities, the high speed processor 918 executing a software architecture for the head-wearable apparatus 300 is used to manage data transfers with high speed wireless circuitry 922. In certain examples, high speed wireless circuitry 922 is configured to implement Institute of Electrical and Electronic Engineers (IEEE) 802.11 communication standards, also referred to herein as Wi-Fi. In other examples, other high-speed communications standards may be implemented by high speed wireless circuitry 922.

The low power wireless circuitry 928 and the high speed wireless circuitry 922 of the head-wearable apparatus 300 can include short range transceivers (Bluetooth™) and wireless wide, local, or wide area network transceivers (e.g., cellular or WiFi). client device 936, including the transceivers communicating via the wireless network 932 and wireless network 934, may be implemented using details of the architecture of the head-wearable apparatus 300, as can other elements of network 938.

The memory 920 includes any storage device capable of storing various data and applications, including, among other things, camera data generated by the left and right, infrared camera 914, and the image processor 908, as well as images generated for display by the image display driver 906 on the image displays of the image display of optical assembly 902. While memory 920 is shown as integrated with high speed circuitry 916, in other examples, memory 920 may be an independent standalone element of the head-wearable apparatus 300. In certain such examples, electrical routing lines may provide a connection through a chip that includes the high speed processor 918 from the image processor 908 or low power processor 926 to the memory 920. In other examples, the high speed processor 918 may manage addressing of memory 920 such that the low power processor 926 will boot the high speed processor 918 any time that a read or write operation involving memory 920 is needed.

As shown in FIG. 9, the low power processor 926 or high speed processor 918 of the head-wearable apparatus 300 can be coupled to the camera (visible light camera 910; infrared emitter 912, or infrared camera 914), the image display driver 906, the 904 (e.g., touch sensor or push button), and the memory 920.

The head-wearable apparatus 300 is connected with a host computer. For example, the head-wearable apparatus 300 is paired with the client device 936 via the wireless network 934 or connected to the server system 930 via the network 938. server system 930 may be one or more computing devices as part of a service or network computing system, for example, that include a processor, a memory, and network communication interface to communicate over the network 938 with the client device 936 and head-wearable apparatus 300.

The client device 936 includes a processor and a network communication interface coupled to the processor. The network communication interface allows for communication over the network 938, wireless network 932 or wireless network 934. client device 936 can further store at least portions of the instructions for generating a binaural audio content in the client device 936's memory to implement the functionality described herein.

Output components of the head-wearable apparatus 300 include visual components, such as a display such as a liquid crystal display (LCD), a plasma display panel (PDP), a light emitting diode (LED) display, a projector, or a waveguide. The image displays of the optical assembly are driven by the image display driver 906. The output components of the head-wearable apparatus 300 further include acoustic components (e.g., speakers), haptic components (e.g., a vibratory motor), other signal generators, and so forth. The input components of the head-wearable apparatus 300, the client device 936, and server system 930, such as the 904, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

head-wearable apparatus 300 may optionally include additional peripheral device elements. Such peripheral device elements may include biometric sensors, additional sensors, or display elements integrated with head-wearable apparatus 300. For example, peripheral device elements may include any I/O components including output components, motion components, position components, or any other such elements described herein.

For example, the biometric components include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), WiFi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over and wireless network 934 from the client device 936 via the low power wireless circuitry 928 or high speed wireless circuitry 922.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Changes and modifications may be made to the disclosed embodiments without departing from the scope of the present disclosure. These and other changes or modifications are intended to be included within the scope of the present disclosure, as expressed in the following claims.

Figure 10:
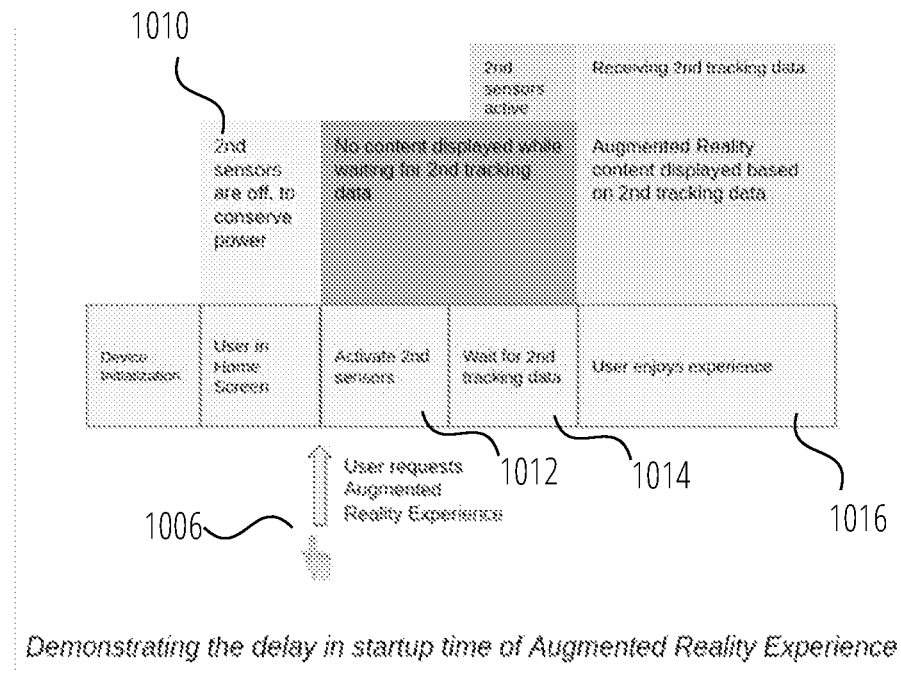
FIG. 10 illustrates startup operations of augmented reality experiences of the subject matter in accordance with one embodiment.
Figure 10:
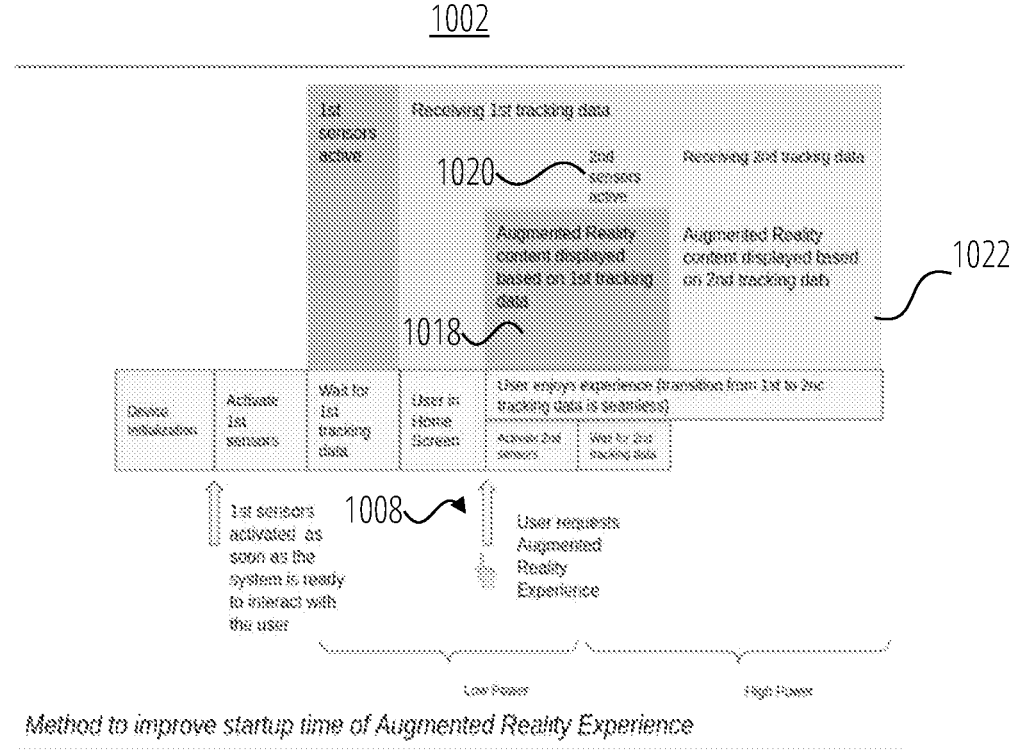

FIG. 10 illustrates startup operations of augmented reality experiences of the subject matter in accordance with one embodiment. In chart 1002, in a sleep mode, the sensors are off to conserve power. The augmented reality system 114 receives the request for an AR experience at 1006. The augmented reality system 114 activates the sensors at 1012. AR content is displayed after a delay 1014 (waiting for the tracking data) at 1016.

In chart 1004, the augmented reality system 114 receives the request for an AR experience at 1008 while the augmented reality system 114 operates in a low power mode using low power tracking system 112. A first set of sensors is already active in the low power mode. As such, AR content can already be display using data from the first set of sensors at 1018. The second set of sensors activates at 1020 in response to the AR request. The augmented reality system 114 updates the AR content based on the data from the set of sensors at 1022.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

Examples

Example 1 is a method comprising: receiving, at a device, a device initialization request, the device comprising a first set of sensors and a second set of sensors; in response to the device initialization request, activating the first set of sensors; receiving first tracking data based on the activated first set of sensors; receiving, at the device, an augmented reality experience request; in response to the augmented reality experience request: causing display, at the device of a set of augmented reality content items base don the first tracking data; and activating the second set of sensors; receiving second tracking data based on the activated second set of sensors; and updating the display of the set of augmented reality content items based on the second tracking data.

Example 2 includes the method of example 1, wherein the second tracking data is further based on the activated first set of sensors.

Example 3 includes the method of example 1, wherein the first set of sensors comprises inertial measurement unit (IMU) sensors.

Example 4 includes the method of example 1, wherein the second set of sensors comprises image sensors.

Example 5 includes the method of example 4, wherein the second tracking data comprises a set of image frames received by the image sensors.

Example 6 includes the method of example 1, wherein receiving the first tracking data comprises: receiving the second tracking data from a six-degrees of freedom tracking system, wherein the six-degrees of freedom tracking system determines rotational pose data and translational pose data.

Example 7 includes the method of example 1, wherein the device is a head-wearable apparatus.

Example 8 is a computing apparatus comprising: a processor; and a memory storing instructions that, when executed by the processor, configure the apparatus to: receive, at a device, a device initialization request, the device comprising a first set of sensors and a second set of sensors; in response to the device initialization request, activate the first set of sensors; receive first tracking data based on the activated first set of sensors; receive, at the device, an augmented reality experience request; in response to the augmented reality experience request: cause display, at the device of a set of augmented reality content items base don the first tracking data; and activate the second set of sensors; receive second tracking data based on the activated second set of sensors; and update the display of the set of augmented reality content items based on the second tracking data.

Example 9 includes the computing apparatus of example 8, wherein the second tracking data is further based on the activated first set of sensors.

Example 10 includes the computing apparatus of example 8, wherein the first set of sensors comprises inertial measurement unit (IMU) sensors.

Example 11 includes the computing apparatus of example 8, wherein the second set of sensors comprises image sensors.

Example 9 includes the computing apparatus of example 11, wherein the second tracking data comprises a set of image frames received by the image sensors.

Example 10 includes the computing apparatus of example 8, wherein receiving track first tracking data comprises: receive the second tracking data from a six-degrees of freedom tracking system, wherein the six-degrees of freedom tracking system determines rotational pose data and translational pose data.

Example 11 includes the computing apparatus of example 8, wherein the device is a head-wearable apparatus.

Example 12 is a non-transitory computer-readable storage medium, the computer-readable storage medium including instructions that when executed by a computer, cause the computer to: receive, at a device, a device initialization request, the device comprising a first set of sensors and a second set of sensors; in response to the device initialization request, activate the first set of sensors; receive first tracking data based on the activated first set of sensors; receive, at the device, an augmented reality experience request; in response to the augmented reality experience request: cause display, at the device of a set of augmented reality content items base don the first tracking data; and activate the second set of sensors; receive second tracking data based on the activated second set of sensors; and update the display of the set of augmented reality content items based on the second tracking data.

Example 13 includes the computer-readable storage medium of claim 15, wherein the second tracking data is further based on the activated first set of sensors.

Example 14 includes the computer-readable storage medium of claim 15, wherein the first set of sensors comprises inertial measurement unit (IMU) sensors.

Example 15 includes the computer-readable storage medium of claim 15, wherein the second set of sensors comprises image sensors.

Example 16 includes the computer-readable storage medium of claim 18, wherein the second tracking data comprises a set of image frames received by the image sensors.

Example 17 includes the computer-readable storage medium of claim 15, wherein receiving track first tracking data comprises: receive the second tracking data from a six-degrees of freedom tracking system, wherein the six-degrees of freedom tracking system determines rotational pose data and translational pose data.

Example 18 includes the computer-readable storage medium of claim 15, wherein the second set of sensors comprises image sensors.

Example 19 includes the computer-readable storage medium of claim 18, wherein the second tracking data comprises a set of image frames received by the image sensors.

Example 20 includes the computer-readable storage medium of claim, wherein receiving track first tracking data comprises: receive the second tracking data from a six-degrees of freedom tracking system, wherein the six-degrees of freedom tracking system determines rotational pose data and translational pose data.

Glossary

"Carrier Signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication Network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both Machine-Storage Media and transmission media. Thus, the terms include both storage devices/media and carrier waves/modulated data signals. The terms "machine-readable medium," "Computer-Readable Medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of Machine-Storage Media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "Machine-Storage Medium," "device-storage medium," "computer-storage medium" mean the same thing and may be used interchangeably in this disclosure. The terms "Machine-Storage Media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method comprising:
   operating a device in a low power mode based on first tracking data from a first set of sensors of the device in response to powering the device;
   detecting, at the device, an augmented reality application request with the device operating in the low power mode;
   in response to detecting the augmented reality application request, displaying augmented reality content based on the first tracking data;
   in response to detecting the augmented reality application request, operating the device in a high power mode based on second tracking data from a second set of sensors of the device; and
   updating the augmented reality content based on the second tracking data.

2. The method of claim 1, wherein operating the device in the low power mode comprises:
   activating the first set of sensors without the second set of sensors upon powering the device; and
   accessing the first tracking data from the first set of sensors.

3. The method of claim 1, wherein operating the device in the high power mode comprises:
   activating the second set of sensors in response to detecting the augmented reality application request; and
   accessing the second tracking data from the second set of sensors.

4. The method of claim 1, further comprising:
   performing a device initialization operation upon powering the device, the device initialization operation being separate from the augmented reality application request; and
   in response to the device initialization operation, activating the first set of sensors without the second set of sensors.

5. The method of claim 1, further comprising:
   operating an augmented reality application at the device, wherein the augmented reality application request comprises a request for the augmented reality application to display augmented reality content in a display of the device.

6. The method of claim 1, wherein the first set of sensors comprises inertial measurement unit (IMU) sensors with a first power consumption.

7. The method of claim 6, wherein the second set of sensors comprises image sensors with a second power consumption that is higher than the first power consumption.

8. The method of claim 7, wherein the second tracking data comprises a set of image frames received by the image sensors.

9. The method of claim 1, wherein receiving the first tracking data comprises:
receiving the first tracking data from a six-degrees of freedom tracking system, wherein the six-degrees of freedom tracking system determines rotational pose data.

10. The method of claim 1, wherein receiving the second tracking data comprises:
receiving the second tracking data from a six-degrees of freedom tracking system, wherein the six-degrees of freedom tracking system determines rotational pose data and translational pose data.

11. A device comprising:
one or more processors; and
a memory storing instructions that, when executed by the one or more processors, configure the device to perform operations comprising:
operating a device in a low power mode based on first tracking data from a first set of sensors of the device in response to powering the device;
detecting, at the device, an augmented reality application request with the device operating in the low power mode;
in response to detecting the augmented reality application request, displaying augmented reality content based on the first tracking data;
in response to detecting the augmented reality application request, operating the device in a high power mode based on second tracking data from a second set of sensors of the device; and
updating the augmented reality content based on the second tracking data.

12. The device of claim 11, wherein operating the device in the low power mode comprises:
activating the first set of sensors without the second set of sensors upon powering the device; and
accessing the first tracking data from the first set of sensors.

13. The device of claim 11, wherein operating the device in the high power mode comprises:
activating the second set of sensors in response to detecting the augmented reality application request; and
accessing the second tracking data from the second set of sensors.

14. The device of claim 11, wherein the operations further comprise:
performing a device initialization operation upon powering the device, the device initialization operation being separate from the augmented reality application request; and
in response to the device initialization operation, activating the first set of sensors without the second set of sensors.

15. The device of claim 11, wherein the operations further comprise:
operating an augmented reality application at the device, wherein the augmented reality application request comprises a request for the augmented reality application to display augmented reality content in a display of the device.

16. The device of claim 11, wherein the first set of sensors comprises inertial measurement unit (IMU) sensors with a first power consumption.

17. The device of claim 16, wherein the second set of sensors comprises image sensors with a second power consumption that is higher than the first power consumption.

18. The device of claim 17, wherein the second tracking data comprises a set of image frames received by the image sensors.

19. The device of claim 11,
wherein the first tracking data comprise rotational pose data,
wherein
the second tracking data comprise rotational pose data and translational pose data.

20. A non-transitory computer-readable storage medium, the non-transitory computer-readable storage medium including instructions that when executed by a computer, cause the computer to perform operations comprising:
operating a device in a low power mode based on first tracking data from a first set of sensors of the device in response to powering the device;
detecting, at the device, an augmented reality application request with the device operating in the low power mode;
in response to detecting the augmented reality application request, displaying augmented reality content based on the first tracking data;
in response to detecting the augmented reality application request, operating the device in a high power mode based on second tracking data from a second set of sensors of the device; and
updating the augmented reality content based on the second tracking data.

* * * * *